United States Patent [19]

Terasaka et al.

[11] Patent Number: 5,405,714
[45] Date of Patent: Apr. 11, 1995

[54] METHOD FOR ACTIVATING AN ALKALINE STORAGE CELL EMPLOYING A NON-SINTERED TYPE NICKEL POSITIVE ELECTRODE

[75] Inventors: Masayuki Terasaka; Masaki Higuchi; Kouzou Ohtsuki; Takuya Tamagawa; Kenji Arisawa, all of Hyogo, Japan

[73] Assignee: Sanyo Electric Co., Ltd., Moriguchi, Japan

[21] Appl. No.: 99,421

[22] Filed: Jul. 30, 1993

[30] Foreign Application Priority Data

Jul. 31, 1992 [JP] Japan ................... 4-205433
Jul. 31, 1992 [JP] Japan ................... 4-205434

[51] Int. Cl.⁶ .................. H01M 10/44; H01M 4/52
[52] U.S. Cl. ........................... 429/52; 429/223
[58] Field of Search ................ 29/623.1; 429/223, 52

[56] References Cited

U.S. PATENT DOCUMENTS 4,935,318 6/1990 Ikoma et al. ................... 429/223 X

FOREIGN PATENT DOCUMENTS

| 53-51449 | 5/1978 | Japan . |
| 126260 | 10/1981 | Japan ................... 429/223 |
| 1-21864 | 1/1989 | Japan . |
| 4-109557 | 4/1992 | Japan . |
| 4-94058 | 3/1993 | Japan . |

*Primary Examiner*—John S. Maples
*Attorney, Agent, or Firm*—Armstrong, Westerman, Hattori, McLeland & Naughton

[57] ABSTRACT

Disclosed is a method for activating a cell employing a non-sintered type nickel positive electrode. The electrode has metallic cobalt powder and either nickel oxyhydroxide in the range of 60 wt % or less excluding 0 wt % or dischargeable higher oxidized cobalt compound powder whose cobalt has a valence of three or more in the range of 60 wt % or less excluding 0 wt %. The method comprising the steps of resting the cell until the positive electrode potential becomes substantially equal to the equilibrium potential of $Co/Co(OH)_2$, and performing initial charging of the cell, following the resting step.

5 Claims, 2 Drawing Sheets

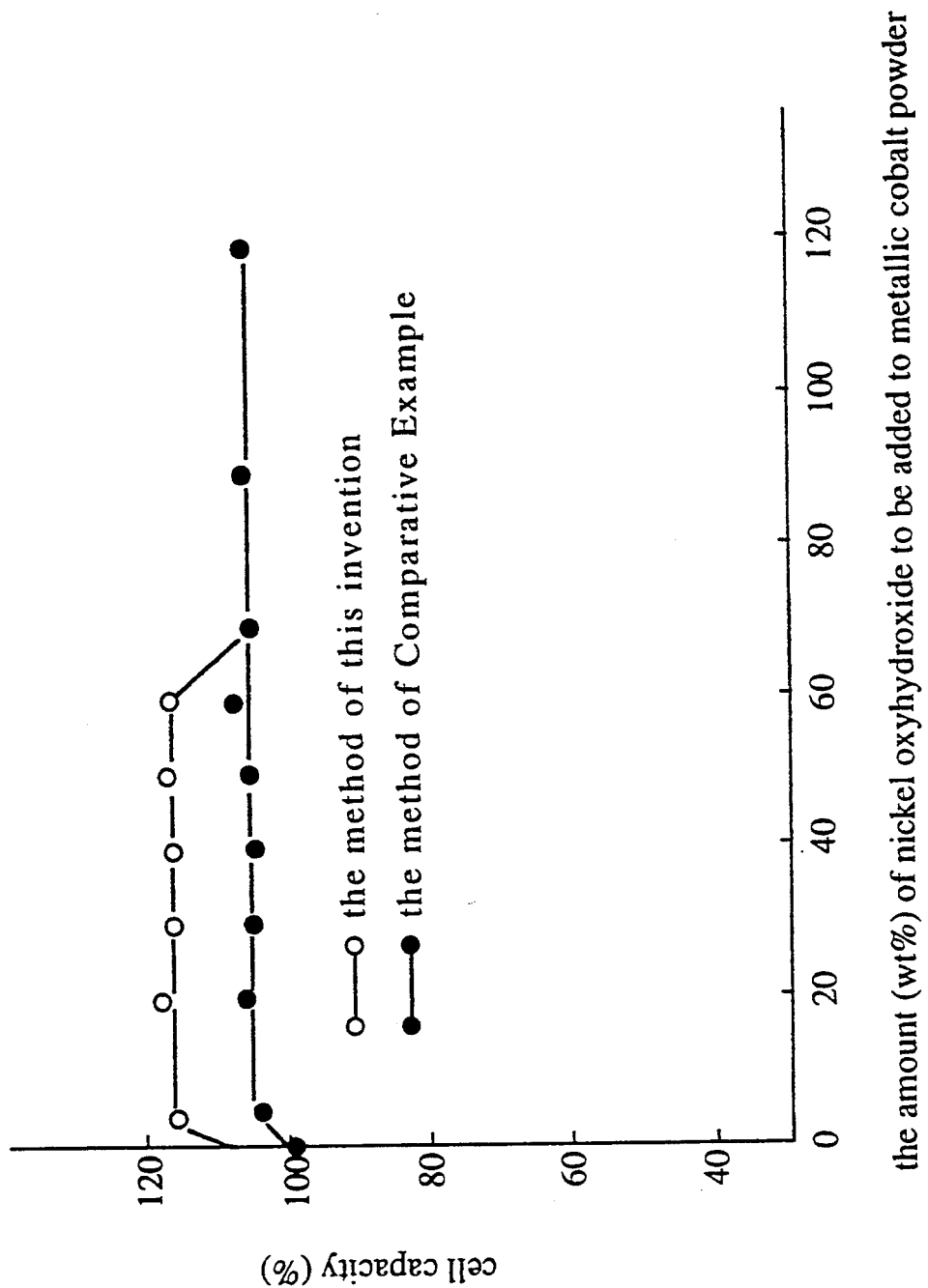

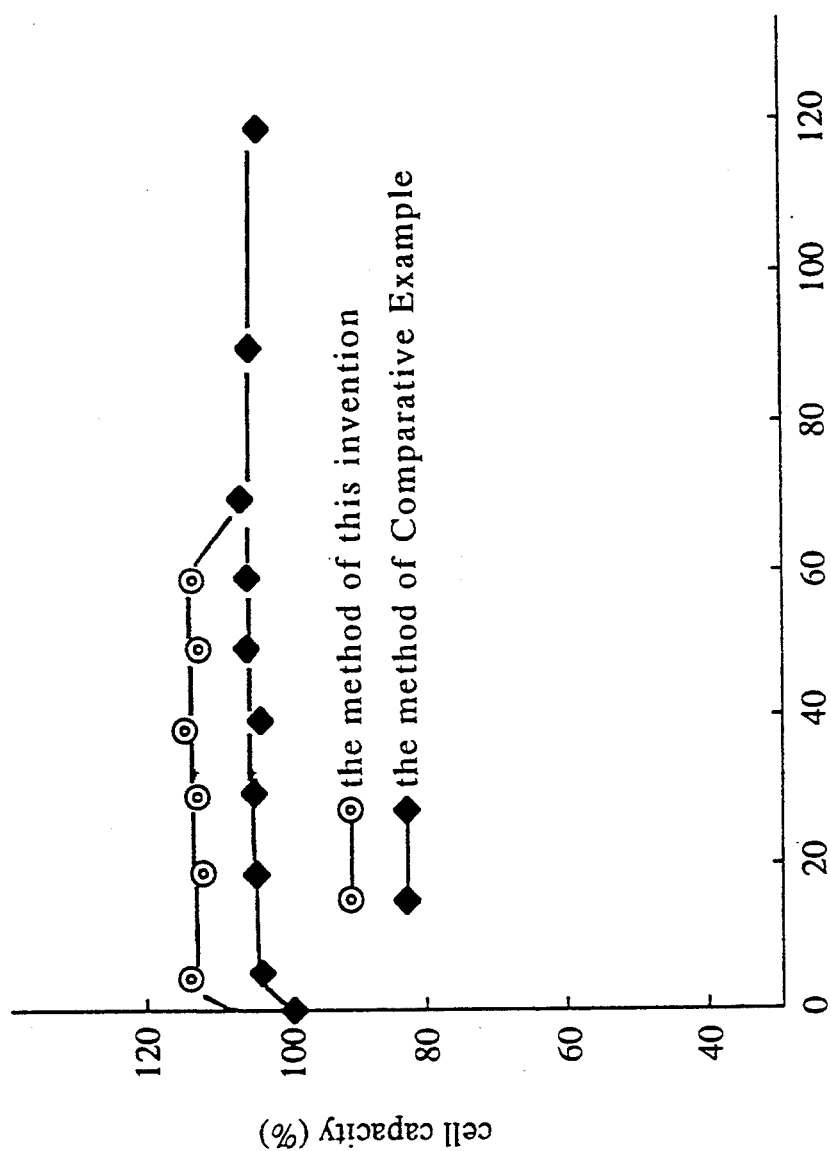

METHOD FOR ACTIVATING AN ALKALINE STORAGE CELL EMPLOYING A NON-SINTERED TYPE NICKEL POSITIVE ELECTRODE

BACKGROUND OF THE INVENTION (1) Field of the Invention

This invention relates to a method for activating an alkaline storage cell employing a non-sintered type nickel positive electrode comprising conductive powder as an activator for active material.

(2) Description of the Related Arts

As disclosed in Japanese Laid-open Patent Application No. 53-51449, conductive powder such as a cobalt compound has been added to active material of the non-sintered type nickel positive electrode in an alkaline storage cell as a conventional method for enhancing the utility of the active material. Among various kinds of cobalt, metallic cobalt is well known to be a most effective additive to that purpose. This is because metallic cobalt, which is conductive itself, is converted into more conductive cobalt oxyhydroxide during charging, thereby further enhancing the conductivity among active material particles.

However, mere addition of metallic cobalt powder does not contribute to fully enhance the utility of the active material. The powder must be oxidized to a preferable extent to achieve this purpose.

Meanwhile, Japanese Laid-open Patent Application No. 64-21864 discloses a method of fully drawing out the ability of metallic cobalt to enhance the utility of active material. According to the disclosed method, a cell employing a nickel positive electrode containing metallic cobalt and a yet-formed negative electrode is charged at a low current in the oxidation area of metallic cobalt followed by the charge at a normal current. However, the inventors of the present invention tried this method and found the oxidation of metallic cobalt powder could not proceed favorably for enhancing the utility of the active material.

To solve this problem, the inventors completed the following batteries, the applications on which were filed to Japanese P.T.O:

(1) An alkaline storage battery which employs a non-sintered type nickel positive electrode comprising a substrate and a mixture. The mixture contains nickel hydroxide powder having a surface layer of nickel oxyhydroxide and a powder of a bivalent cobalt compound (Japanese Laid-open Patent Application No. 4-94058).

(2) An alkaline storage battery which employs a non-sintered type positive electrode comprising a substrate and active material. A cobalt compound whose cobalt has a valence of two or less and a higher oxidized cobalt compound whose cobalt has a valence of three or more are added to the active material (Japanese Laid-open Patent Application No. 4-109557).

In the application (1), nickel oxyhydroxide, which can work as active material, is used as an oxidant to chemically encourage the oxidation of the metallic cobalt powder.

In the application (2), the dischargeable higher oxidized cobalt compound powder whose cobalt has a valence of three or more is used as an oxidant to chemically encourage the oxidation of the metallic cobalt powder, thereby enhancing the utility of the active material.

However, an alkaline storage battery constructed in accordance with the application (1) or (2) does not always bring out the ability of the nickel oxyhydroxide powder or the cobalt compound powder added to the positive electrode to encourage the oxidation of the metallic cobalt powder, and as a result, the ability of the metallic cobalt powder to enhance the utility of an active material may not be fully drawn out. Hence, it is required to find out conditions under which these oxidants can preferably progress the oxidation of the metallic cobalt.

SUMMARY OF THE INVENTION

In view of the foregoing problem, the main object of this invention is to provide a further more effective method for activating an alkaline storage cell employing a non-sintered type nickel positive electrode than in the above-mentioned applications (1) and (2) so as to increase the capacity of the cell.

The object can be achieved by first resting a cell employing a non-sintered type nickel electrode until the potential of the electrode become substantially equal to the equilibrium potential of $Co/Co(OH)_2$, and then performing initial charging of the cell. The positive electrode comprises metallic cobalt powder and either nickel oxyhydroxide in the range of 60 wt % or less excluding 0 wt % or dischargeable higher oxidized cobalt compound powder whose cobalt has a valence of three or more in the range of 60 wt % or less excluding 0 wt %.

The method of this invention allows either nickel oxyhydroxide powder or the dischargeable higher oxidized cobalt compound powder whose cobalt has a valence of three or more to sufficiently react upon the metallic cobalt powder so that the ability of the metallic cobalt powder to enhance the utility of an active material can be fully drawn out. This improves the characteristics of the above-mentioned alkaline storage cell, especially the capacity thereof.

According to the method of this invention, either nickel oxyhydroxide powder or dischargeable higher oxidized cobalt compound powder whose cobalt has a valence of three or more can be given enough time to encourage the oxidation of the metallic cobalt powder in the positive electrode while the alkaline storage cell is being rested after having been fabricated. Furthermore, if the cell is rested until the potential of the positive electrode drops to the equilibrium potential of $Co/Co(OH)_2$, the metallic cobalt powder is preferentially made susceptible to electrochemical oxidation. Accordingly, if the initial charging is started when the potential of the positive electrode becomes equal to the equilibrium potential, electrochemical oxidation of the metallic cobalt powder can properly proceed during the operation (conditioning), thereby fully drawing out the ability of the metallic cobalt powder to enhance the utility of the active material. This increases the capacity of the alkaline storage cell employing the non-sintered type nickel positive electrode.

Such effects of this invention are detailed as follows with reference to Chemical Formulas 1, 2, and 3 below.

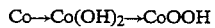   [Chemical Formula 1]

   [Chemical Formula 2]

$$Co^* + Co \rightarrow Co^{**} + Co(OH)_2 \quad \text{[Chemical Formula 3]}$$

wherein Co* is dischargeable higher oxidized cobalt compound power whose cobalt has a valence of three or more and Co** is a reducing product of Co*.

As shown in Chemical Formula 1, metallic cobalt is converted to cobalt hydroxide and then to cobalt oxyhydroxide. As shown in Chemical Formula 2, nickel oxyhydroxide, which converts metallic cobalt into cobalt hydroxide, is in turn reduced to a reducing product nickel hydroxide. As shown in Chemical Formula 3, a cobalt compound whose cobalt has a valence of three or more, which converts metallic cobalt into cobalt hydroxide, is in turn reduced to a reducing product of Co*. The conversion from metallic cobalt powder to cobalt hydroxide proceeds gradually starting from the surface of the metallic cobalt powder, which is in contact with the electrolyte. The conversion from cobalt hydroxide to cobalt oxyhydroxide is achieved by the diffusion of protons in a solid phase of cobalt hydroxide, so that the conversion proceeds comparatively easily once the metallic cobalt power is converted to cobalt hydroxide. Therefore, if the metallic cobalt powder is too rapidly oxidized, its surface only is converted far into cobalt oxyhydroxide, and as the result, a thin cobalt oxyhydroxide film is formed over the surface of the metallic cobalt powder, leaving its internal portion still unconverted. The film works as a barrier between metallic cobalt and the electrolyte ($OH^-$ ion), hindering a further progress of the oxidation.

If metallic cobalt added to the positive electrode is put in a passive state, its oxidation does not sufficiently proceed, so that the ability of enhancing the utility of the active material can not be fully drawn out. Hence, it is required to avoid rapid oxidation of the surface of the metallic cobalt, and allows the entire metallic cobalt to go through the reaction shown in Chemical Formula (1).

Through the analysis on the oxidation characteristics of metallic cobalt powder in a cell, the inventors of this invention have completed the present invention according to which a cell is rested under proper conditions after having been fabricated (after its electrolyte is injected) prior to the initial charging. This allows the metallic cobalt powder to be appropriately oxidized through a reaction with either nickel oxyhydroxide powder or dischargeable higher oxidized cobalt powder having a valence of three or more added in the positive electrode and, as a result, to get susceptible to electrochemical oxidation.

The principle of the method of this invention is further detailed as follows:

Nickel oxyhydroxide powder or the dischargeable higher oxidized cobalt compound powder whose cobalt has a valence of three or more being added in the positive electrode works as an oxidant and is well mixed with the metallic cobalt powder to oxidize it chemically. This means that, unlike electrochemical oxidation, chemical oxidation is not affected by the different conductivity of each portion of the positive electrode, thus encouraging the oxidation of the entire electrode.

However, even if the oxidant is added, the metallic cobalt powder is not oxidized electrochemically during the initial charging until the oxidant has sufficiently reacted upon the metallic cobalt powder. Therefore, according to this invention, the ratio of either nickel oxyhydroxide powder or the dischargeable higher oxidized cobalt compound powder whose cobalt has a valence of three or more to cobalt powder is fixed to 60 wt % or lower. In addition, the fabricated cell is supposed to be rested until the potential of the positive electrode becomes substantially equal to the equilibrium potential of $Co/Co(OH)_2$ expressed by Chemical Formula 4. This allows metallic cobalt powder to be preferentially made susceptible to electrochemical oxidation, thereby more effectively encouraging its oxidation during the initial charging. The positive electrode potential may become a mixed potential by including other potentials than that shown in Chemical Formula 4 below, so that it is hard to determine an accurate value. Therefore, the potential of the positive electrode obtained when it becomes stable may be considered to be the equilibrium potential herein.

$$Co + 2OH^- \rightleftharpoons Co(OH)_2 + 2e^- \quad \text{[Chemical Formula 4]}$$

As explained hereinbefore, according to the method of this invention, chemical and electrochemical oxidations are performed cooperatively in a cell, and the cooperation can fully draw out the ability of metallic cobalt powder to enhance the utility of the active material. This can remarkably improve the characteristics of an alkaline storage cell employing a non-sintered type nickel positive electrode, especially the capacity thereof.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 1 is a graph showing the relationship between the amount of nickel oxyhydroxide to be added in a cell and the cell capacity according to this invention and to Comparative Example.

FIG. 2 is a graph showing the relationship between the amount of higher oxidized cobalt compound powder to be added in a cell and the cell capacity according to this invention and to Comparative Examples.

DESCRIPTION OF THE PREFERRED EMBODIMENT (EXAMPLE)

[Preparation of nickel oxyhydroxide powder]

At first, 2 liter of an aqueous solution of 10 wt % sodium hypochlorite was added to 100 g of nickel hydroxide powder (Fisher sub-sieve sizer size FSS: 9.0 $\mu$m) and they were stirred for three hours in room temperature for oxidizing the nickel hydroxide powder. Then, the resultant powder was well rinsed and dried to form nickel oxyhydroxide powder, which was identified by X-ray diffraction method.

[Preparation of the dischargeable higher oxidized cobalt compound powder whose cobalt has a valence of three or more]

At first, 100 g of cobalt hydroxide powder (Fisher sub-sieve sizer size FSS: 2.0 $\mu$m) was mixed with 100 g of an aqueous solution of 20 wt % sodium hydroxide, and the mixture was heat treated for thirty minutes in the air at 100° C. Then, it was rinsed and dried to form discharegable higher oxidized cobalt compound powder. The degree of oxidation of this cobalt powder was confirmed by the following method:

70 wt % of the above-prepared cobalt powder was mixed with 30 wt % of an aqueous solution of 1 wt % methyl-cellulose. The resultant slurry was filled in a foaming nickel substrate and dried to form a cobalt compound electrode. Cathode current was passed between this cobalt compound electrode and nickel counter electrodes in a 30 wt % potassium hydroxide aqueous solution. As the result, it was confirmed that the quantity of electricity consumed in the reduction from cobalt oxyhydroxide to cobalt hydroxide is about 0.1 AH/g. This is electrochemically interpreted that the above-prepared cobalt has a valence of three or more.

[Preparation of nickel hydroxide positive electrodes]

1) First, nickel hydroxide powder (FSS: 9.0 μm) and the above-prepared nickel oxyhydroxide powder were mixed in a certain ratio. Then, 90 wt % of this mixture was further mixed with 10 wt % of metallic cobalt powder (FSS: 1.0 μm) to prepare active material powder for the positive electrode. Then, 50 wt % of a 1 wt % methylcellulose aqueous solution was added to 100 wt % of the active material powder. The resultant slurry was filled in foaming nickel substrates and dried to form positive electrodes. The above-mentioned "a certain ratio" means that the amount of nickel hydroxide powder decreases according as the amount of nickel oxyhydroxide powder to be added increases.

Thus, 10 different positive electrodes each containing 0, 5, 20, 30, 40, 50, 60, 70, 90, or 120 wt % of nickel oxyhydroxide to metallic cobalt powder were prepared.

2) The above-prepared cobalt powder having a valence of three or more in the ratio of respectively 0, 5, 20, 30, 40, 50, 60, 70, 90, and 120 wt % to metallic cobalt powder was added to the mixture powder containing 90 wt % of nickel hydroxide powder (FSS: 9.0 μm) and 10 wt % of metallic cobalt powder (FSS: 1.0 μm) to produce 10 different mixture powder. Then, 50 wt % of a 1 wt % methylcellulose aqueous solution was added to the above-produced mixed powder to produce an active material slurry. The slurry is filled in the foaming nickel substrates and dried to form positive electrodes.

Thus, 10 different nickel hydroxide positive electrodes each containing different amount of metallic cobalt powder having a valence of three or more were produced.

[Preparation of non-sintered type cadmium negative electrodes]

At first, cadmium oxide powder and metallic cadmium powder were mixed with an adhesive liquid to be formed into a paste. This paste was pressed on a punching metal followed by drying and rolling. Thus produced electrodes were charged up to 240% of the nominal capacity (1.2 AH) at a current of 0.2 C and then discharged at a current of 0.2 C for formation. Finally, the electrodes were rinsed and dried to prepare non-sintered type cadmium negative electrodes.

[Production of nickel cadmium storage cells]

Each pair of the above-prepared nickel hydroxide positive electrodes and non-sintered type cadmium negative electrodes was wound up to form an electrode group with a polypropylene nonwoven separator, and then it was sealed after a potassium hydroxide aqueous solution was poured thereinto. Thus, sealed nickel-cadmium storage cells (JIS, KR-A size, nominal capacity: 1.2 AH) were produced.

Among the cells thus produced, cells whose positive electrodes containing nickel oxyhydroxide powder are called Cells A and the other cells whose positive electrodes containing dischargeable higher oxidized cobalt compound powder whose cobalt has a valence of three or more are called Cells B.

These nickel cadmium storage cells containing the dischargeable higher oxidized cobalt compound powder whose cobalt has a valence of three or more have cell voltage higher than 0.1 V immediately after the production.

[Activation of the cells]

The above-produced sealed nickel cadmium storage cells: Cells A and B were rested in room temperature until their potential drops to the equilibrium potential of Co/Co(OH)$_2$ (about 0.1 V as cell voltage). Then, these cells were charged up to 200% of the nominal capacity (1.2 V) at 0.1 C and then discharged at 1.0 C to produce activation-processed cells.

Cells A and Cells B thus processed according to the method of this invention are referred to as Cells A(act) and Cells B (act) respectively.

[Comparative Example]

After having been fabricated, the above-produced Cells A and B were rested. In this example, however, the resting was suspended before their potential drop to the equilibrium potential of Co/Co(OH)$_2$ (cell voltage: about 0.1 V) and charge/discharge were performed under the same conditions as the method of this invention.

Cells A and Cells B thus processed according to the method of Comparative Example are referred to as Cells $A_o$ and Cells $B_o$ respectively.

[Experiment]

Cells A(act), Cells B(act), Cells $A_o$, and Cells $B_o$ were formed with various amount of nickel oxyhydroxide or dischargeable higher oxidized cobalt compound powder whose cobalt has a valence of three or more, and each cell capacity was measured. FIG. 1 shows the results of Cells A(act) and Cells $A_o$ each having a nickel oxyhydroxide positive electrode and FIG. 2 shows those of Cells B(act) and Cells $B_o$ each having a positive electrode composed of the dischargeable higher oxidized cobalt compound powder whose cobalt has a valence is three or more. Each cell containing 0% of nickel oxyhydroxide or the dischargeable higher oxidized cobalt compound powder whose cobalt has a valence of three or more was used as a reference for each group.

As apparent from FIG. 1, Cells A(act) and Cells B(act) both processed according to the method of this invention have larger capacity than Cells $A_o$ and Cells $B_o$ processed according to the method of Comparative Example.

However, the method of this invention could not be applied to the cells containing nickel oxyhydroxide powder or cobalt powder having a valence of three or more in a ratio of more than 60 wt % to metallic cobalt powder. This is because the potential dependent on the nickel oxyhydroxide powder or the dischargeable higher oxidized cobalt compound powder whose cobalt has a valence of three or more becomes dominant in the cell, so that the cell voltage does not go down to 0.1 V, which corresponds to the equilibrium potential of Co/Co(OH)$_2$.

The results of the experiment shown in FIGS. 1 and 2 prove that the method of this invention can be effective when the alkaline storage cell is in the following conditions:

The cell employs a non-sintered type nickel hydroxide positive electrode containing metallic cobalt powder and either nickel oxyhydroxide powder or dischargeable cobalt powder having a valence of three or more. In addition, either powder is contained in a ratio of 60 wt % or less to the metallic cobalt powder.

To obtain better results, the ratio is preferably in a range between 5% and 60%.

Although nickel-cadmium storage cells are used in the above embodiment, nickel-hydrogen storage cells, nickel-iron storage cells, nickel-zinc storage cells or the like may be used instead.

The electrode voltage of these storage cells corresponding to the equilibrium potential of Co/Co(OH)$_2$ is shown in the Table 1 below.

[TABLE 1]

| Cells | Cell Voltage (V) |
|---|---|
| nickel—cadmium | 0.05–0.15 |
| nickel—hydrogen | 0.05–0.15 |
| nickel—iron | 0.15–0.22 |
| nickel—zinc | 0.50–0.60 |

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method for activating a storage cell employing a non-sintered type nickel positive electrode, said electrode comprising metallic cobalt powder and one of nickel oxyhydroxide in the range of 60 wt % or less excluding 0 wt % and dischargeable higher oxidized cobalt compound powder whose cobalt has a valence of three or more in the range of 60 wt % or less excluding 0 wt %, said method comprising the steps of:

resting said cell until the positive electrode potential becomes substantially equal to the equilibrium potential of Co/Co(OH)$_2$; and performing initial charging of said cell, following said resting step.

2. A method according to claim 1, wherein the storage cell is a nickel-cadmium storage cell and the equilibrium potential of the Co/Co(OH)$_2$ is 0.05–0.15 volts.

3. A method according to claim 1, wherein the storage cell is a nickel-hydrogen storage cell and the equilibrium potential of the Co/Co(OH)$_2$ is 0.05–0.15 volts.

4. A method according to claim 1, wherein the storage cell is a nickel-iron storage cell and the equilibrium potential of the Co/Co(OH)$_2$ is 0.15–0.22 volts.

5. A method according to claim 1, wherein the storage cell is a nickel-zinc storage cell and the equilibrium potential of the Co/Co(OH)$_2$ is 0.50–0.60 volts.

* * * * *